(12) United States Patent
Mnich

(10) Patent No.: US 10,189,107 B2
(45) Date of Patent: *Jan. 29, 2019

(54) SHORT ARC WELDING SYSTEM

(75) Inventor: Andrzej Mnich, Opole (PL)

(73) Assignee: ESAB AB, Gothenburg (SE)

( * ) Notice: Subject to any disclaimer, the term of this patent is extended or adjusted under 35 U.S.C. 154(b) by 753 days.

This patent is subject to a terminal disclaimer.

(21) Appl. No.: 13/698,489

(22) PCT Filed: May 28, 2010

(86) PCT No.: PCT/EP2010/057407
§ 371 (c)(1),
(2), (4) Date: Jan. 22, 2013

(87) PCT Pub. No.: WO2011/147461
PCT Pub. Date: Dec. 1, 2011

(65) Prior Publication Data
US 2013/0112674 A1 May 9, 2013

(51) Int. Cl.
*B23K 9/10* (2006.01)
*B23K 9/073* (2006.01)
*B23K 9/09* (2006.01)
*B23K 9/095* (2006.01)

(52) U.S. Cl.
CPC ........... *B23K 9/1006* (2013.01); *B23K 9/073* (2013.01); *B23K 9/091* (2013.01); *B23K 9/095* (2013.01)

(58) Field of Classification Search
CPC ...... B23K 9/073; B23K 9/1006; B23K 9/095; B23K 9/091
USPC .......................................... 219/130.1, 130.31
See application file for complete search history.

(56) References Cited

U.S. PATENT DOCUMENTS

| 3,621,362 A | * | 11/1971 | Schwarz | H02M 3/3155 331/117 R |
| 3,659,184 A | * | 4/1972 | Schwarz | H02M 3/156 327/100 |
| 3,689,734 A | * | 9/1972 | Burley | B23K 9/091 219/130.32 |
| 3,893,015 A | * | 7/1975 | Weil | H02M 7/49 307/6 |
| 3,904,846 A | * | 9/1975 | Risberg | B23K 9/073 219/130.33 |

(Continued)

FOREIGN PATENT DOCUMENTS

| JP | S52111854 A | 9/1977 |
| JP | S54-45076 A | 4/1979 |

(Continued)

OTHER PUBLICATIONS

Notification of Reasons for Refusal with translation for Japanese Patent Application No. 2013-511549 dated Nov. 20, 2013, 6 pages.

(Continued)

*Primary Examiner* — Eric Stapleton
(74) *Attorney, Agent, or Firm* — Edell, Shapiro & Finnan, LLC

(57) ABSTRACT

A system for controlling a weld-current in an arc welding apparatus for short arc welding comprising a current regulator included in a voltage feedback loop from a power supply to a welding electrode and a ramp generator arranged to provide current ramps during a short circuit phase at said welding electrode.

7 Claims, 2 Drawing Sheets

(56) References Cited

U.S. PATENT DOCUMENTS

| | | | | |
|---|---|---|---|---|
| 3,953,779 A | * | 4/1976 | Schwarz | H02M 3/3155 363/28 |
| 4,048,468 A | * | 9/1977 | Maule | B23K 9/1006 219/130.1 |
| 4,117,303 A | * | 9/1978 | Hedberg | B23K 9/1006 219/130.1 |
| 4,152,759 A | * | 5/1979 | Hedberg | H02M 7/519 363/136 |
| 4,200,830 A | * | 4/1980 | Oughton | H02J 7/022 320/140 |
| 4,241,285 A | * | 12/1980 | Golonka, Sr. | B23K 9/1012 219/130.32 |
| 4,247,752 A | * | 1/1981 | Stringer | B23K 9/0732 219/130.33 |
| 4,369,489 A | * | 1/1983 | Pruitt | H02M 3/3155 363/28 |
| 4,382,171 A | * | 5/1983 | Hedberg | B23K 9/0734 219/130.1 |
| 4,394,604 A | * | 7/1983 | Brecy | B60L 15/04 318/257 |
| 4,460,949 A | * | 7/1984 | Steigerwald | H02M 3/3155 363/136 |
| 4,520,255 A | * | 5/1985 | Bredenkamp | B23K 9/1006 219/130.1 |
| 4,544,826 A | * | 10/1985 | Nakanishi | B23K 9/10 219/123 |
| 4,581,692 A | * | 4/1986 | Nayberg | H02M 3/3155 363/27 |
| 4,628,427 A | * | 12/1986 | Marvakov | H03K 3/57 219/130.51 |
| 4,769,754 A | * | 9/1988 | Reynolds | B23K 9/091 219/130.21 |
| 4,899,741 A | * | 2/1990 | Bentley | A61B 18/28 374/141 |
| 5,237,492 A | * | 8/1993 | King | H02M 3/33546 363/46 |
| 5,341,283 A | * | 8/1994 | Niederer | H02M 1/34 363/28 |
| 5,345,375 A | * | 9/1994 | Mohan | H02J 3/01 307/105 |
| 5,408,067 A | * | 4/1995 | Crouse | B23K 9/1043 219/130.21 |
| 5,428,267 A | * | 6/1995 | Peil | H02M 3/28 315/224 |
| 5,436,427 A | * | 7/1995 | Bourque | B23K 9/1043 219/130.01 |
| 5,471,378 A | * | 11/1995 | King | H02M 3/33546 363/46 |
| 5,499,178 A | * | 3/1996 | Mohan | H02J 3/01 307/105 |
| 5,674,155 A | * | 10/1997 | Otto | F16H 45/02 192/3.3 |
| 5,683,602 A | * | 11/1997 | Stava | B23K 9/091 219/130.32 |
| 5,714,831 A | * | 2/1998 | Walker | H02N 2/062 310/316.01 |
| 5,715,150 A | * | 2/1998 | Stava | H02M 3/28 363/132 |
| 5,734,147 A | * | 3/1998 | Bunker | B23K 9/1006 219/130.33 |
| 5,783,799 A | * | 7/1998 | Geissler | B23K 9/1043 219/130.21 |
| 5,814,788 A | * | 9/1998 | Everhart | B23K 9/1043 219/130.33 |
| 6,005,220 A | * | 12/1999 | Bunker | B23K 9/1012 219/130.33 |
| 6,009,008 A | * | 12/1999 | Pelly | H02H 7/125 363/125 |
| 6,015,964 A | * | 1/2000 | Baker | B23K 9/092 219/130.33 |
| 6,087,626 A | * | 7/2000 | Hutchison | B23K 9/091 219/130.01 |
| 6,088,187 A | * | 7/2000 | Takaishi | G11B 5/5552 360/78.05 |
| 6,107,602 A | * | 8/2000 | Geissler | B23K 9/1043 219/130.31 |
| 6,114,655 A | * | 9/2000 | Reynolds | B23K 9/1043 219/130.33 |
| 6,115,273 A | * | 9/2000 | Geissler | B23K 9/1056 363/89 |
| 6,124,581 A | * | 9/2000 | Ulrich | H05B 6/08 219/626 |
| 6,177,651 B1 | * | 1/2001 | Reynolds | B23K 9/1068 219/130.1 |
| 6,266,257 B1 | * | 7/2001 | Geissler | B23K 9/1043 363/55 |
| 6,278,081 B1 | * | 8/2001 | Reynolds | B23K 9/1043 219/130.31 |
| 6,326,591 B1 | * | 12/2001 | Hutchinson | B23K 9/091 219/130.01 |
| 6,426,888 B2 | * | 7/2002 | Geissler | B23K 9/1043 363/53 |
| 6,469,454 B1 | * | 10/2002 | Mader | H05B 41/2824 315/291 |
| 6,498,321 B1 | * | 12/2002 | Fulmer | B23K 9/1056 219/130.33 |
| 6,592,412 B1 | * | 7/2003 | Geil | B63B 1/042 114/144 E |
| 6,625,046 B2 | * | 9/2003 | Geissler | B23K 9/1043 363/53 |
| 6,653,595 B2 | * | 11/2003 | Hutchison | B23K 9/091 219/130.21 |
| 6,683,286 B2 | * | 1/2004 | Ulrich | H05B 6/06 219/661 |
| 6,800,832 B2 | * | 10/2004 | Hutchison | B23K 9/091 219/130.21 |
| 6,849,828 B2 | * | 2/2005 | Aigner | H02M 7/5236 219/130.21 |
| 6,865,096 B1 | * | 3/2005 | Geissler | B23K 9/1056 363/53 |
| 6,987,243 B2 | * | 1/2006 | Hutchison | B23K 9/091 219/130.21 |
| 7,019,504 B2 | * | 3/2006 | Pullen | H02M 3/156 323/283 |
| 7,141,759 B2 | * | 11/2006 | Mela | B23K 9/1006 219/130.21 |
| 7,173,214 B2 | * | 2/2007 | Nadzam | B23K 9/092 219/130.21 |
| 7,276,861 B1 | * | 10/2007 | Shteynberg | H02M 3/157 315/224 |
| 7,286,922 B1 | * | 10/2007 | Fischer | F16H 61/143 192/54.1 |
| 7,336,512 B2 | * | 2/2008 | Geissler | B23K 9/1043 363/53 |
| 7,598,474 B2 | * | 10/2009 | Hutchison | B23K 9/091 219/130.01 |
| 7,778,056 B2 | * | 8/2010 | Geissler | B23K 9/1056 363/53 |
| 7,986,537 B2 | * | 7/2011 | Nakamura | H02M 3/33523 323/285 |
| 8,199,536 B2 | * | 6/2012 | Mangraviti | H02M 3/33507 363/21.08 |
| 8,988,064 B2 | * | 3/2015 | Hakoda | H02M 3/335 324/127 |
| 9,012,807 B2 | * | 4/2015 | Ott | B23K 9/095 219/130.1 |
| 9,108,263 B2 | * | 8/2015 | Manthe | B23K 9/0673 |
| 2005/0007087 A1 | * | 1/2005 | Pullen | H02M 3/156 323/283 |
| 2005/0224481 A1 | * | 10/2005 | Nadzam | B23K 9/092 219/130.51 |
| 2006/0163229 A1 | * | 7/2006 | Hutchison | B23K 9/091 219/130.21 |
| 2008/0129220 A1 | * | 6/2008 | Shteynberg | H02M 3/157 315/291 |
| 2008/0291707 A1 | | 11/2008 | Fang | |
| 2009/0103335 A1 | * | 4/2009 | Nakamura | H02M 1/32 363/21.17 |

(56) References Cited

U.S. PATENT DOCUMENTS

| | | | | |
|---|---|---|---|---|
| 2010/0045187 A1* | 2/2010 | Shteynberg | ........... | H02M 3/157 |
| | | | | 315/149 |
| 2010/0157628 A1* | 6/2010 | Mangraviti | ....... | H02M 3/33507 |
| | | | | 363/16 |
| 2010/0308026 A1* | 12/2010 | Vogel | .................... | H02M 3/157 |
| | | | | 219/130.21 |
| 2011/0011842 A1* | 1/2011 | Thomas | ............... | B23K 9/1043 |
| | | | | 219/130.21 |
| 2013/0112674 A1* | 5/2013 | Mnich | .................... | B23K 9/073 |
| | | | | 219/130.31 |
| 2013/0119038 A1* | 5/2013 | Mnich | .................... | B23K 9/073 |
| | | | | 219/130.31 |

FOREIGN PATENT DOCUMENTS

| | | |
|---|---|---|
| JP | H10-091690 A | 4/1998 |
| JP | 2006-122957 A | 5/2006 |
| WO | 2004/080639 A1 | 9/2004 |

OTHER PUBLICATIONS

First Examination Report for Indian Patent Application 10227/DELNP/2012 dated Jul. 6, 2018, 8 pages.

\* cited by examiner

SHORT ARC WELDING SYSTEM

FIELD OF INVENTION

The present invention relates to a system for controlling a weld-current in a direct current arc welding apparatus for short arc welding. The present invention in particular relates to a system for controlling a weld-current in an direct current arc welding apparatus for short arc welding comprising a current regulator included in a voltage feedback loop, and a ramp generator arranged to provide current ramps during a short circuit. The invention furthermore relates to a method for controlling a power source.

BACKGROUND OF INVENTION

The present invention relates to a system for controlling a weld-current in a direct current arc welding apparatus for short arc welding. Short arc welding is a metal transfer mode in gas metal arc welding where a drop of molten metal will dip into a weld pool before detachment from a consumable electrode in a process of metal transfer.

In gas metal arc welding a consumable electrode is continuously fed towards a welding zone. In general a system for metal arc welding includes a welding torch, a work piece, a power source, a wire feed unit and a shielding gas supply. A system for metal arc welding furthermore includes a system for controlling a weld-current of the power source. The system for controlling the weld-current is provided to generate a reference current to the power source. The reference current controls the power source such that melting of the wire electrode and transfer of the molten metal to the work piece may be controlled as desired. The weld-current and voltage are controlled to ensure that the welding may be performed in a desired metal transfer mode.

In Gas Metal Arc Welding (GMAW), including both Metal Active Gas welding (MAG) and Metal Inert Gas (MIG) welding, an electric arc is established between the work piece and the consumable wire electrode. The arc continuously melts the wire as it is fed to the weld puddle. The arc and the molten material are shielded from the atmosphere by a flow of an inert gas, or an active gas mixture. The MIG and MAG welding processes operate on D.C. (direct current) usually with the wire electrode positive. This is known as "reverse" polarity. "Straight" polarity, is less frequently used because of poor transfer of molten metal from the wire electrode to the work piece. Weld-currents of from 50 amperes up to more than 600 amperes are commonly used at welding voltages of 15V to 32V. A stable, self correcting arc may be obtained by using a constant voltage power source and a constant wire feed speed. Continuing developments have made the MIG process applicable to the welding of all commercially important metals such as steel, aluminum, stainless steel, copper and several others.

The MIG and MAG welding processes provide many advantages in manual and automatic metal joining for both low and high production applications. Its combined advantages when compared to manual metal arc welding (MMA) submerged arc (SAW), and tungsten inert gas (TIG) are:
1) Welding is possible in all positions.
2) No slag removal required.
3) High weld metal deposition rate.
4) Overall times for weld completion about ½ that of covered electrode.
5) High welding speed. Less distortion of the work piece.
6) High weld quality.
7) Large gaps filled or bridged easily, making certain kinds of repair welding more efficient.
8) No stub loss as with stick electrode In MIG and MAG welding technologies distinction is made between different metal transfer modes: short arc transfer mode, mixed arc (globular) transfer mode, spray arc transfer mode, and pulsed spray arc transfer mode.

During short arc transfer mode fairly large molten droplets are created. The molten droplet will grow to a state where it bridges a gap between the electrode and a weld pool. A short-circuit of the power source and an extinction of the arc will take place momentarily. A pinch effect will be controlled by a ramp generator to complete the transfer of the molten droplet to the weld pool. Short arc welding is performed at a relatively low voltage and weld-current.

As the weld-current and voltage are increased above the maximum recommended for short arc welding, mixed arc transfer occurs. The droplets, which may vary in size, are made up of a mixture of short-circuiting and non-circuiting droplets. This mode of metal transfer can be erratic, with spatter and fumes being common.

In spray arc welding mode small molten droplets are randomly transferred from the electrode. The small molten droplets do not short-circuit the arc. In spray arc welding the arc is stable and no troublesome spatter is produced.

In pulsed spray arc welding mode small molten droplets are transferred, one by one by control of a pulsed weld-current, from the electrode without short-circuiting the arc. Pulsed arc welding requires complex and expensive welding apparatuses.

Short-arc welding is performed at a relatively low voltage and weld-current. The feeding speed of the wire is adapted to the weld-current such that a droplet of molten metal is transferred to the work piece at contact with the work piece. The size of the droplet should be such that splatter generally is avoided.

Short-arc welding normally uses small wire in the range of 0.030 in. (0.76 mm) to 0.045 in. (1.1 mm) diameter and operates at low arc lengths (low voltages) and weld-currents. A small, fast solidifying weld puddle is obtained. This welding technique is particularly useful for joining thin materials in any position, thick materials in the vertical and overhead position, and for filling large gaps. Short arc welding should also be used where minimum distortion of the work piece is a requirement. Metal is transferred from the wire to the weld pool only when contact between the two is made, or at each short circuit. The wire short circuits to the work piece 20 to 200 times per second.

FIG. 1 schematically illustrates one complete ideal short arc cycle. A droplet of molten material develops at the end of the electrode. When the droplet touches the weld pool (A) the arc short-circuits, weld-current begins to rise and the droplet is transferred. Thereafter the arc is reignited. The wire is fed with a velocity allowing contact between the droplet and the weld pool to take place before detachment of the droplet. During contact between the electrode and the weld pool via the droplet, the arc will be extinguished by another short (I). Thereafter the cycle begins again. There is no metal transferred during the arcing period; only at the short circuits. The cycle is ideal in the sense that no so-called open circuit state occurs.

An open circuit state is a state when there is neither an arc nor short circuit at the electrode. The open circuit state has a higher voltage between the electrode and the work piece in comparison to the arc state. High voltage at the open circuit state enables a more rapid transition from short circuit state to arc state.

The short arc welding process is by its nature stochastic and turbulent. The control of the welding process in short circuit phase and arc phase is challenging, and the occurrence of open circuit state adds to the complexity of controlling the short arc welding process. Open circuit state is normally undesired and has a random appearance.

In the voltage feedback loop, the voltage between the electrode and the welding pool is measured. The measured voltage is compared to a reference voltage. The current regulator regulates an output current in dependence of the difference between the sensed voltage and the reference voltage in order to reduce the regulation error in a conventional manner. Suitably a PI-regulator may be used for this purpose.

In prior art systems for controlling short arc welding, the arc phase is usually voltage controlled by a voltage regulator connected in series with a current rise limiter. This leads to difficulty of control of the arc and short circuit state since the voltage regulator will have an influence on the current raise limiter and vice versa.

SUMMARY OF THE INVENTION

It is an object of the invention to further improve a system for controlling a weld-current in a short arc welding apparatus in order to further stabilize a short arc welding process.

It is a further object of the invention to provide a system for controlling a weld-current in a direct current apparatus for short arc welding which facilitates accurate control at both the arc phase and the short circuit phase of short arc welding.

These objects are achieved by a system for controlling a weld-current in an arc welding apparatus for short arc welding according to claim 1. The system for controlling the weld-current comprises a current regulator included in a voltage feedback loop from a power supply to a welding electrode.

In short circuit welding an open circuit state may be randomly present. During open circuit state there is a break in the process such that neither an arc nor a short circuit occurs at the electrode. At the open circuit state an open circuit voltage is present between the electrode and the work piece. The open circuit voltage is an embedded feature of the power source. The open circuit voltage is usually considerably higher than the working voltage during the short-circuit phase or during the arc phase. The open circuit states during the short arc welding occur at the lower range of the short arc range, when the average voltage and the wire feed speed are low. The power source in short-arc welding is in prior art systems controlled by a voltage regulator in a feedback loop from the power source, which regulator is using the average voltage during short circuit and arc phases as a control parameter. The open-loop states increase the average output voltage. If the power source is controlled by a voltage regulator which does not compensate for the open-loop voltage during the open circuit state, the voltage regulator will reduce the output voltage of the power source.

Reduction of the output voltage of the power source shortens the arc phases, causing more open circuit phases. In result, the voltage regulator construes the operating situation as that output voltage is seemingly high, while it is in fact low during the productive phases of the welding, that is the short-circuit phase and the arc phase. The system will therefore remain in a state with frequent occurrences of open circuit states, which makes the welding inefficient and of low quality.

By, as suggested in an embodiment of the invention, suppressing the error signal in to the current regulator when an open circuit state is detected, the misinterpretation of the high voltage during open circuit state can be avoided. The operation condition at the arc shape can therefore be accurately controlled by the current regulator in the voltage feedback loop without influence from a randomly appearing open circuit state.

In particular the open circuit detector may be connected to a switch which is arranged to connect or disconnect an input of said current regulator with an output of said subtraction node in dependence of whether an open circuit state is detected or not.

The power source is a constant current power source, which controls the current between the welding electrode and the work piece in dependence of an incoming reference current. In the voltage feedback loop the welding voltage is sensed and compared with a voltage reference value to form an input to the current regulator included in the voltage feedback loop. During the arc phase the voltage over the electrode is controlled by the current regulator in the voltage feedback loop. Hence, the constant current power source is given a constant voltage characteristic during arc phase due to the voltage feedback control of the reference current during arc phase.

A ramp generator is arranged to provide current ramps during a short circuit phase. The current ramps provided during the short circuit phase are provided to complete the transfer of the molten droplet to the weld pool. This is performed by a pinch effect resulting from the current ramp. In order to generate a stable welding condition the shape of the weld-current during short circuit phase is of importance. It is desirable to have a good control of the shape of the current ramp to avoid splatter and to enable stable control of the welding process. Ramp generators and their function are well known to persons skilled in the art. A person skilled in the art may therefore in a conventional manner select the components of the ramp generator to achieve a desired shape of the current ramp. The current ramp generated by the ramp generator is added to the output current from the current regulator in the voltage feedback loop to form a reference current for the power supply.

The current response during short circuit phase is to a high degree responsible for the stability of the welding process. With current response is here intended the variation of output current at the electrode in dependence of the change of the load occurring for instance when the short circuit occurs, or when the short circuit state changes to the arc state. The current response depends on the structure of the feedback loop controlling the reference current to the power supply as well as on the shape of the ramp provided by the ramp generator.

By separating the ramp generator and current regulator in the voltage feedback loop and arranging them in parallel it is readily feasible to have a voltage control over the arc at arc state and a current control in short circuit state. The current regulator in the voltage feedback loop controls the reference current so as to reduce a regulation error between an output voltage and a reference voltage. The current regulator is a PI regulator enabling control of the average voltage. Since the integration in the current regulator makes the response from the current regulator slow, any change in the output voltage during the short circuit phase, will not result in an immediate correction of the output current from the current regulator. Hence, the power supply will be current controlled during the short circuit phase and voltage controlled during the arc phase and thus act as a constant voltage power source in arch phase and as a constant current power source during arc phase. With current controlled is intended that the output current of the power source is controlled. With voltage controlled is intended that the output voltage of the power source is controlled. The reference current to a power supply is the sum of said output current from said current regulator and said current ramp provided from said current regulator. By arranging the ramp generator and current regulator in parallel, the precise control of the reference current is facilitated since the influence of the current regulator in the voltage feedback loop is reduced.

The voltage feedback loop may include a subtraction node at which a feedback error is generated from the difference between a measured arc voltage and a reference voltage.

The voltage feedback loop may include an open circuit detector which is arranged to detect that an open circuit state is present and to suppress an error signal when an open circuit state is detected.

The system may further include a short circuit state detector having a threshold level for detection of a short circuit state, which threshold level is dependent on a magnitude of the reference current supplied to the power source.

The invention also relates to a short arc welding system including a power source and a welding torch connected to the power source, which power source is controlled by a system as described above.

The invention further relates to a method for controlling a power source in a direct current arc welding apparatus for short arc welding comprising a current regulator included in a voltage feedback loop from a power supply to a welding electrode and a ramp generator arranged to provide current ramps during a short circuit phase at said welding electrode. In the method according to the invention, an output current of power source is controlled during the short circuit phase. During the arc phase an output voltage of the power source is controlled.

The method according to the invention enables good control of the shape of the current ramp during short circuit phase, while enabling a straight forward control of voltage during the arc phase.

In an embodiment of the invention an open circuit state is detected for enabling suppression of a regulation error during a period of the open circuit state. Hence open circuit states will not affect the current reference value thus enabling control of the output voltage with high accuracy and preventing drift of the reference current due to the high voltage between the electrode and the work piece at open circuit state.

BRIEF DESCRIPTION OF FIGURES

An embodiment of the invention will be described with references to appended drawings, where.

EMBODIMENT OF THE INVENTION

Figure 2:
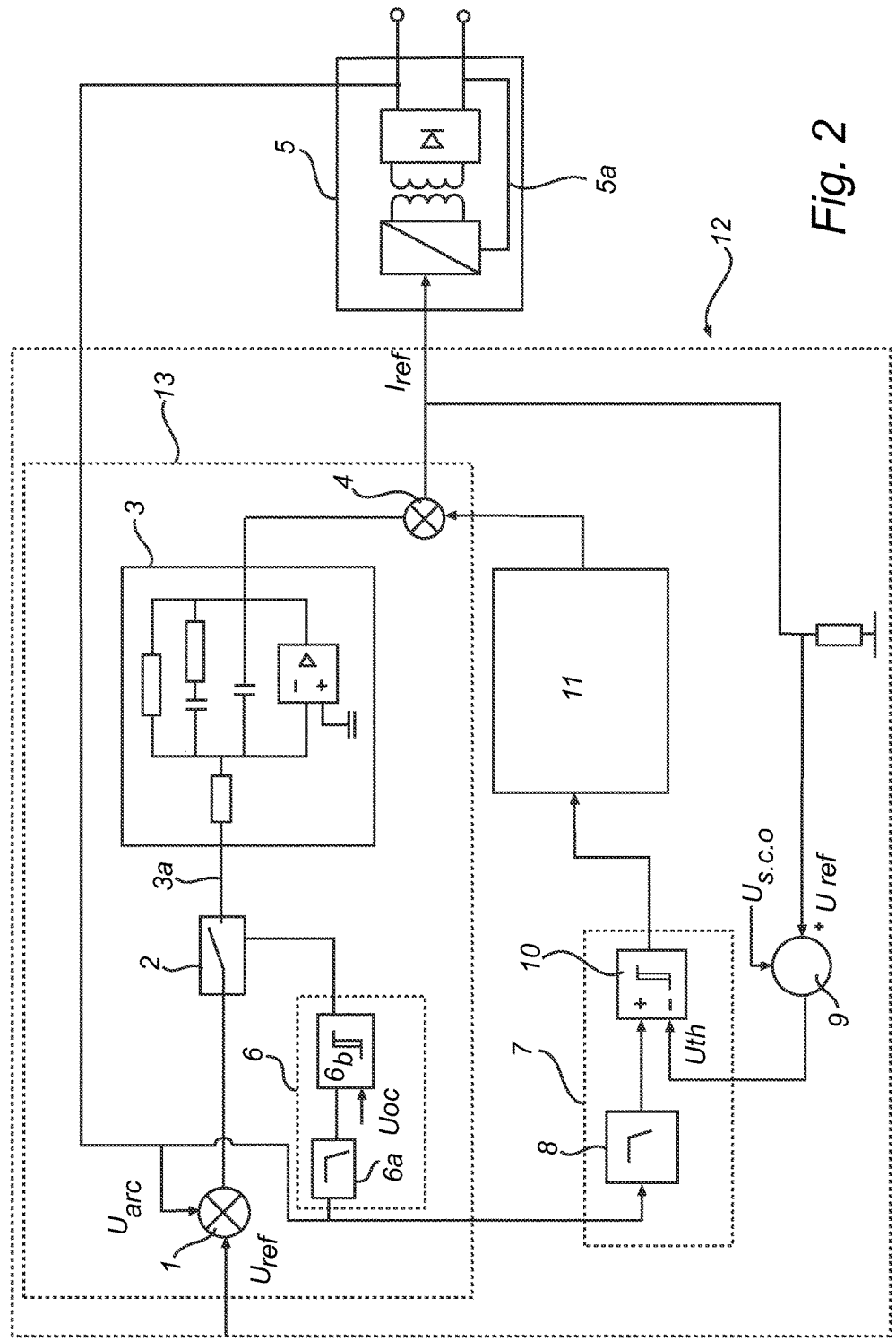
FIG. 2 is a schematic drawing of a system for controlling a weld-current in an arc welding apparatus for short arc welding according to the invention.

FIG. 2 shows a system 12 for controlling a weld-current in an arc welding apparatus 20 (FIG. 3) for short arc welding.

A voltage feedback loop 13 controls the voltage at a welding electrode connected to a constant current power source.

Figure 1:
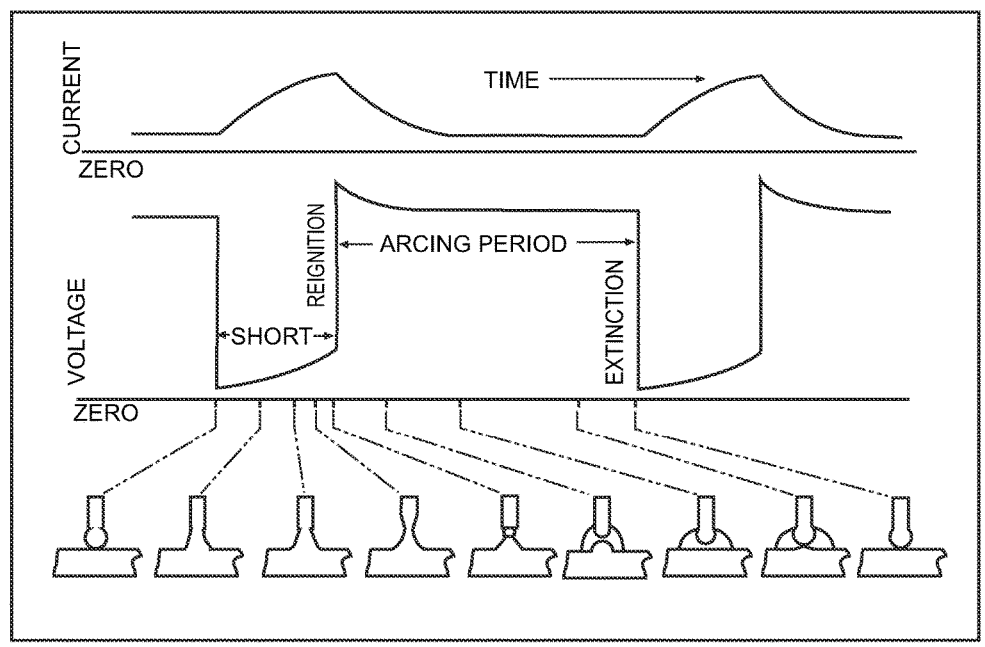
FIG. 1 shows a general description of a state of the art short arc welding process.
Figure 3:
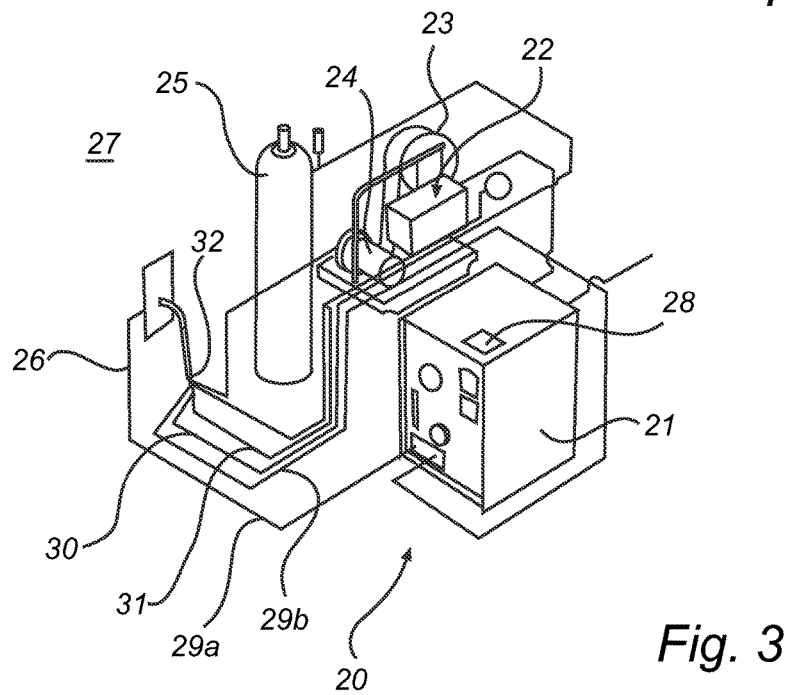
FIG. 3 shows a schematic drawing of a welding system.

The constant current power source includes a current feedback loop 5a which compares an output current with a reference current provided from a system 12 for controlling a weld-current in the arc welding apparatus 20 (FIG. 3). A current regulator included in the constant current power supply 5 controls the output current of the power supply in dependence of a regulation error between the reference current and the output current.

The voltage feedback loop 13 includes a subtraction node 1 where the output voltage Uarc is subtracted from the reference voltage Uref in the node 1. The difference between the output voltage Uarc and the reference voltage Uref constitutes a regulation error E, which is delivered to the PI regulator 3 as an input signal via a switch 2.

The voltage feedback loop 13 furthermore includes a current regulator, preferably a PI regulator 3, a switch 2 and an open circuit state detector 6.

The switch 2 is driven by the signal from an open circuit state detector 6, which comprises low-pass filter 6a and the comparator 6b. The open circuit voltage threshold Uo.c. is the threshold level above which only the open circuit state is possible. The current regulator 3 has an input 3a connected to the switch 2. The switch 2 is opened when an open circuit state is sensed by the open circuit state detector 6. Therefore the input voltage to the PI regulator, which input voltage corresponds to the regulation error, will be set to zero.

Hence, the PI regulator 3 will assume that the voltage over the electrode and working piece is appropriate during the open circuit state. When the input signal to the PI regulator is suppressed during the open circuit state, the PI regulator will remain in its present state and neither internal charges nor the output current Ireg from the PI regulator will be changed. In this way voltage regulating feedback loop will not take account of the increased feedback voltage during non-arc phases.

In a summing node 4, delivering a reference current signal Iref to the power supply 5, the signal from the PI regulator 3 is added to the signal from the ramp generator 11.

The state of the short circuit is sensed by a short circuit detector 7, which comprises low-pass filter 8 and the comparator 10. When a detected voltage Uarc is below a threshold value Uth, which may be dependent on the reference current, the ramp generator is connected to generate a current ramp.

The threshold of the comparator 10 may be current dependant. The threshold signal is created in the summing node 9 by adding a signal proportional to the current reference Iref and zero-current threshold voltage Us.c.o. When the short circuit detector detects a short circuit state, the ramp generator 11 will create an additional ramp current ramp with predefined up- and down-slopes.

FIG. 3 schematically represents an arc welding apparatus 20 for short arc welding. The short arc welding system 20 includes a power source 21, a welding control system 22, a wire reel 23, a wire feed motor 24, a shielding gas supply 25 and a welding torch 26. The system in the figure is set up for performing a welding operation on a welding piece 27.

A system for controlling the weld-current 28 according to the invention is connected to the power source for control of the weld-current during operation. The system for controlling the welding current 28 may conveniently be integrated in the casing of the power source 21.

The output voltage of the power source and the weld-current may be controlled by the circuit described in FIG. 2. One power cable 29a from the power source is connected to the working piece 27 and the other 29b is connected to the electrode 32 of the welding torch 26, optionally via the welding control system 22.

The shielding gas supply 25 is connected to the welding torch 2 by a tube system. The amount of gas can be regulated via the welding control system 22.

Further, cooling channels may be present in the welding torch. Cooling liquid inlet and outlet channels 30, 31 may be connected to the cooling channels in the welding torch.

The wire feed motor 24 controls the feeding of the welding electrode during operation.

The invention claimed is:

1. A system for controlling a weld-current in a direct current arc welding apparatus for short arc welding comprising:
   a current regulator included in a voltage feedback loop from a power supply to a welding electrode;
   an open circuit detector included in the voltage feedback loop, the open circuit detector being configured to detect that an open circuit state is present and to suppress a feedback error when an open circuit state is detected by the open circuit detector;
   a node configured to receive an output voltage of the power supply and to generate a voltage signal derived from the output voltage;
   a switch connected between the node and the current regulator; and
   a ramp generator arranged to provide current ramps during a short circuit phase at the welding electrode,
   wherein the open circuit detector comprises a comparator that receives an open circuit voltage threshold and a signal derived from the output voltage, the open circuit voltage threshold comprising a threshold level above which only the open circuit state is possible, the comparator having an output directly connected to the switch,
   wherein the switch is configured to, based on the output of the comparator, connect or disconnect the current regulator to receive the voltage signal from the node.

2. A system for controlling a weld-current according to claim 1, wherein the node is a subtraction node, wherein the subtraction node is configured to calculate a difference between the output voltage and a reference voltage.

3. A system for controlling a weld-current according to claim 1, wherein the current regulator and the ramp generator are connected in parallel and provide a reference current for the power supply to the welding electrode.

4. A system for controlling a weld-current according to claim 3, wherein the reference current is a sum of an output current from the current regulator and a current ramp provided from the ramp generator.

5. A system for controlling a weld-current according to claim 1, wherein the current regulator is a PI regulator.

6. A system for controlling a weld-current according to claim 1, wherein the system further includes a short circuit state detector having a threshold level for detection of a short circuit state, wherein the threshold level is dependent on a magnitude of a reference current supplied to the power supply.

7. A direct current short arc welding system including a power source and a welding torch connected to a power source, wherein the power source is controlled by the system for controlling a weld-current according to claim 1.

* * * * *